July 17, 1923.
M. HERMANN
1,462,284
METHOD OF MAKING HYDRATED LIME
Filed Jan. 12, 1921
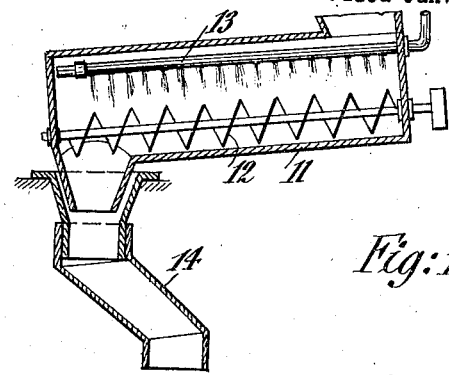
Fig:1.
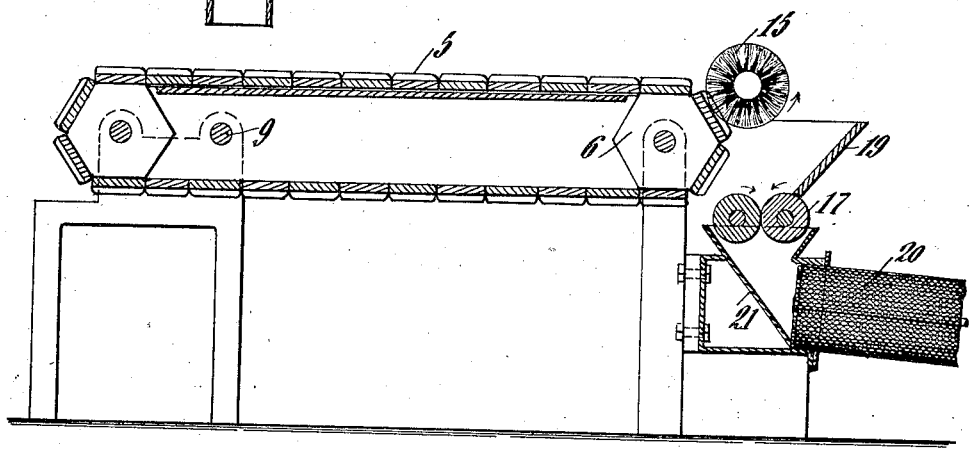
Fig:2.
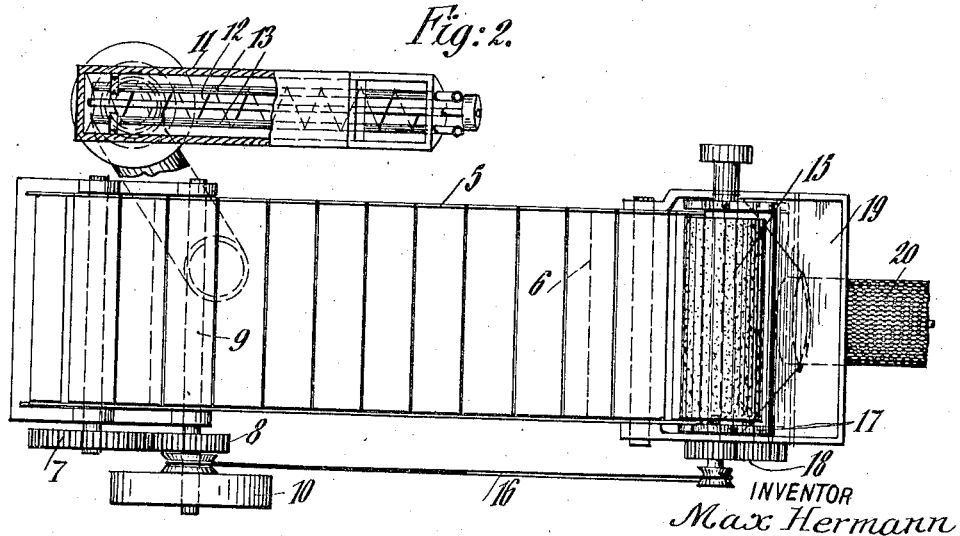
INVENTOR
Max Hermann
BY C. P. Goepel
ATTORNEY Patented July 17, 1923.

1,462,284

UNITED STATES PATENT OFFICE.

MAX HERMANN, OF NEW YORK, N. Y.

METHOD OF MAKING HYDRATED LIME.

Application filed January 12, 1921. Serial No. 436,675.

*To all whom it may concern:*

Be it known that I, MAX HERMANN, a citizen of the United States of America, and a resident of the borough of Manhattan, city and State of New York, have invented certain new and useful Improvements in Methods of Making Hydrated Lime, whereof the following is a specification.

This invention relates to a method of reducing burnt lump lime to powdered hydrated lime.

The object of the invention is to provide a simple and economical method of producing hydrated lime in powder form.

In carrying out this invention, lime in the form of lumps or blocks, is subjected to a water spray under a relative motion of the lime with respect to the spray, then the so moistened lime is caused to fall in crumbled form upon, become distributed over and be exposed to evaporative action on a moving means, and then the product is collected in the form of powdered hydrated lime.

In the accompanying drawings, which represent a convenient form of apparatus for carrying out this invention, Figure 1 represents a longitudinal vertical section of the apparatus. Fig. 2 represents a top plan view thereof.

The same reference characters indicate corresponding parts in the different figures.

Referring in detail to the drawing, 5 indicates a flexible slat apron of endless articulated construction which is supported upon the spaced rollers 6 of suitable size and shape. This apron may be driven by means of a chain and sprocket, gearing or in any other suitable manner and I have herein shown for this purpose the gear 7 fixed upon the axis of one of the rollers 6 and meshing with gear 8 on the transverse shaft 9 to which belt wheel 10 driven from any suitable source or power is fixed.

Above the apron 5 and at one side thereof a trough 11 is arranged, said trough being relatively short and preferably inclined slightly with respect to the apron 5. In this trough a conveyor screw 12 is mounted and may be driven by any convenient means. A water spray pipe 13 also extends longitudinally through the trough 11 above the conveyor 12 and is adapted to deliver cold water in a plurality of jets upon the lime as it is carried by the conveyor screw 12 from the upper end of the trough to the lower end thereof where it is delivered by said screw into an adjustable distributing spout 14. This adjustable spout may be of any approved construction and is adapted for swinging movement over the upper stretch of the apron 5 at one end thereof so that the lime may be evenly distributed from the outlet of the said spout upon the apron. As the lime is moved through the trough by the conveyor 12, it absorbs moisture so that when it is delivered on the apron 5, it disintegrates and falls into a powder, and as it is carried along by the top run of the apron, it is exposed to air and surplus moisture evaporated. The lime in this condition is carried by the apron 5 and at the opposite end of said apron a brush 15 is mounted. This brush is driven by the belt connection 16 from the shaft 9, said belt being twisted so as to rotate the brush in a direction opposite to the movement of the apron. In some cases all of the lime may not completely disintegrate but some of it may remain in lump form, in such cases I use a pair of crushing rolls 17 which are driven by suitable gearing 18 from the brush shaft. The lime is directed upon and between these rolls by the plate 19 so that all lumps are thoroughly crushed. Below the rolls the rotating sifting screen 20 is mounted and into one end thereof the lime is directed by the plate 21. This screen is of suitable mesh so as to sift the lime to the desired fineness, which is finally bagged and stored.

I claim as my invention:

The method of making hydrated lime which consists in subjecting lump lime to a water spray under a relative movement of the lime with reference to the spray, then causing the so moistened lime to fall upon, become distributed over and be exposed to evaporative action on a moving means, and then collecting the product in the form of powdered hydrated lime.

In testimony that I claim the foregoing as my invention, I have signed my name hereunder.

MAX HERMANN.